US012472602B2

(12) United States Patent
Ma et al.

(10) Patent No.: US 12,472,602 B2
(45) Date of Patent: Nov. 18, 2025

(54) TEXTURED CMP PAD COMPRISING POLYMER PARTICLES

(71) Applicant: CMC Materials, Inc., Aurora, IL (US)

(72) Inventors: Rui Ma, Aurora, IL (US); Kaiting Li, Portland, OR (US); Jessica Tabert, Aurora, IL (US); Sangcheol Kim, Chicago, IL (US); Satish Rai, Aurora, IL (US)

(73) Assignee: CMC MATERIALS LLC, Aurora, IL (US)

( * ) Notice: Subject to any disclaimer, the term of this patent is extended or adjusted under 35 U.S.C. 154(b) by 530 days.

(21) Appl. No.: 17/902,210

(22) Filed: Sep. 2, 2022

(65) Prior Publication Data

US 2023/0076804 A1 Mar. 9, 2023

Related U.S. Application Data

(60) Provisional application No. 63/240,103, filed on Sep. 2, 2021.

(51) Int. Cl.
*B24B 37/24* (2012.01)
*C08L 75/04* (2006.01)

(52) U.S. Cl.
CPC .............. *B24B 37/24* (2013.01); *C08L 75/04* (2013.01)

(58) Field of Classification Search
CPC ....................................................... B24B 37/24
See application file for complete search history.

(56) References Cited

U.S. PATENT DOCUMENTS

| | | | | |
|---|---|---|---|---|
| 4,745,153 | A | 5/1988 | Hoffman | |
| 5,578,362 | A | 11/1996 | Reinhardt et al. | |
| 7,371,160 | B1 | 5/2008 | Cruz et al. | |
| 2004/0011699 | A1 | 1/2004 | Park | |
| 2004/0021243 | A1* | 2/2004 | Shih | C08G 18/10 264/53 |
| 2005/0176251 | A1 | 8/2005 | Duaong | |
| 2005/0197050 | A1 | 9/2005 | Prasad et al. | |
| 2006/0046622 | A1 | 3/2006 | Prasad | |
| 2006/0089093 | A1* | 4/2006 | Swisher | B24B 37/24 451/526 |
| 2006/0189269 | A1* | 8/2006 | Roy | B24D 18/00 451/526 |

(Continued)

FOREIGN PATENT DOCUMENTS

| | | |
|---|---|---|
| JP | 2004001169 A | 1/2004 |
| JP | 2009214220 A | 9/2009 |

(Continued)

OTHER PUBLICATIONS

English translation of Office Action issued in Taiwan counterpart application No. 11133393, mail date of Office Action Apr. 21, 2023.

(Continued)

*Primary Examiner* — Alexandra M Moore

(57) ABSTRACT

A chemical mechanical polishing pad comprising a polishing portion, the polishing portion comprising: a polymeric body; a plurality of polymer particles embedded within the body of the polymeric body, wherein at least a portion of the plurality of polymer particles is at least partially exposed at a surface of the polymeric body; and a plurality of pores at the surface of the polymeric body.

13 Claims, 4 Drawing Sheets

(56) References Cited

U.S. PATENT DOCUMENTS

| | | | | |
|---|---|---|---|---|
| 2007/0042693 | A1 | 2/2007 | Saikin | |
| 2007/0275226 | A1 | 11/2007 | Kulp | |
| 2008/0153395 | A1 * | 6/2008 | Kulp | B24B 37/24 451/41 |
| 2010/0009611 | A1 * | 1/2010 | Fukuda | B24D 3/26 427/373 |
| 2010/0029182 | A1 * | 2/2010 | Fukuda | B24B 37/24 451/41 |
| 2011/0105000 | A1 | 5/2011 | Hu et al. | |
| 2013/0252519 | A1 | 9/2013 | Daskiewich | |
| 2015/0133039 | A1 * | 5/2015 | Ahn | B24D 11/003 451/526 |
| 2015/0367478 | A1 | 12/2015 | Lefevre | |
| 2018/0297174 | A1 | 10/2018 | Krishnan et al. | |
| 2019/0168356 | A1 * | 6/2019 | Qian | B24B 37/044 |
| 2020/0101657 | A1 | 4/2020 | Krishnan et al. | |
| 2020/0207904 | A1 | 7/2020 | Joeng et al. | |
| 2021/0008687 | A1 | 1/2021 | Ma et al. | |

FOREIGN PATENT DOCUMENTS

| | | | |
|---|---|---|---|
| JP | 2011115935 | A | 6/2011 |
| KR | 20040025510 | A | 3/2004 |
| KR | 20180059818 | A1 | 6/2018 |
| KR | 102197481 | B1 | 12/2020 |
| TW | 200902228 | A | 1/2009 |
| WO | 2008005708 | A1 | 1/2008 |
| WO | 2017127221 | A1 | 9/2017 |

OTHER PUBLICATIONS

Sung, et al., Sound absorption behavior of flexible polyurethane foams including high molecular-weight copolymer polyol, Oct. 2017, Polymers for Advanced Technologies 29(2); DOI:10.1002/pat.4195, 9 pages.

Zhang, et al., Development of Particle-containing Epoxy-resin Polishing Pads, 2018 International Conference on Power, Energy and Environmental Engineering (ICPEEE 2018), 7 pages.

Zlatanic, et al., Polyurethane Molded Foams With High Content of Hyperbranched Polyols From Soybean Oil, Journal of Cellular Plastics published on-line, May 29, 2014, 20 pages.

Rath, et al., Effect of Average Particle Size and Distribution on the Performance of Copolymer Polyols, Journal of Cellular Plastics, First Published Sep. 1, 2003, 3 pages.

Aneja, Structure-property relationships of flexible polyurethane foams, Diss. Virginia Tech, 2002, 35 pages.

Kaushiva, et al., Influences of coploymer polyol on structural and viscoelastic properties in molded flexible polyurethane foams; Journal of Applied Polymer Science, vol. 78, Issue 4, p. 766-786; First published Aug. 4, 2000.

PCT/US2022/042461, "International Search Report", PCT Application No. PCT/US2022/042461, Dec. 22, 2022, 4 pages.

* cited by examiner

TEXTURED CMP PAD COMPRISING POLYMER PARTICLES

TECHNICAL FIELD

This disclosure generally relates to polishing pads used in chemical mechanical planarization, and more specifically to a textured CMP pad comprising polymer particles.

BRIEF DESCRIPTION OF FIGURES

To assist in understanding the present disclosure, reference is now made to the following description taken in conjunction with the accompanying drawings, in which.

DETAILED DESCRIPTION

Figure 1:
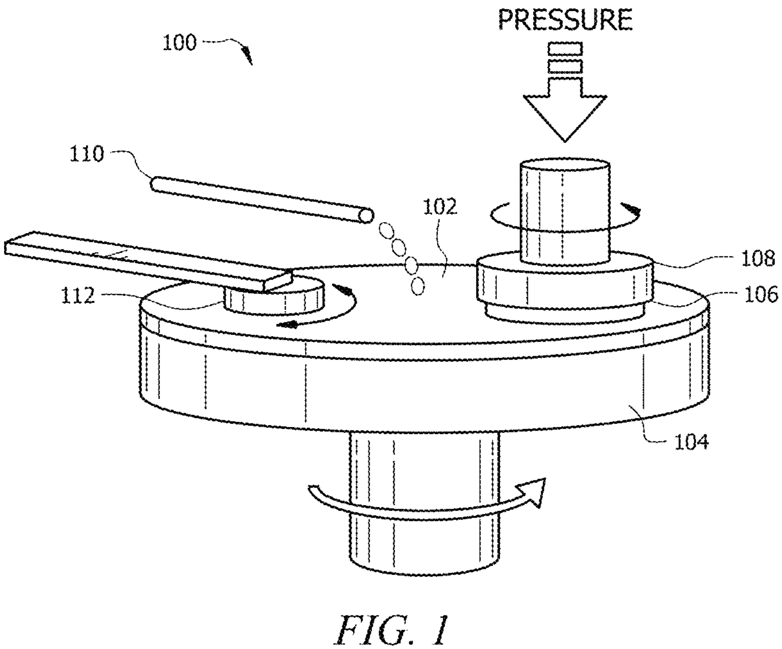
FIG. 1 is a diagram of an example system for chemical mechanical planarization.

It should be understood at the outset that, although example implementations of embodiments of the disclosure are illustrated below, the present disclosure may be implemented using any number of techniques, whether currently known or not. The present disclosure should in no way be limited to the example implementations, drawings, and techniques illustrated below. Additionally, the drawings are not necessarily drawn to scale.

An integrated circuit is typically formed on a substrate by the sequential deposition of conductive, semi-conductive, and/or insulative layers on a silicon wafer. A variety of fabrication processes require planarization of at least one of these layers on the substrate. For example, for certain applications (e.g., polishing of a metal layer to form vias, plugs, and lines in the trenches of a patterned layer), an overlying layer is planarized until the top surface of a patterned layer is exposed. In other applications (e.g., planarization of a dielectric layer for photolithography), an overlying layer is polished until a desired thickness remains over the underlying layer. Chemical mechanical planarization (CMP) is one method of planarization. This planarization method typically involves a substrate being mounted on a carrier head. The exposed surface of the substrate is typically placed against a polishing pad on a rotating platen. The carrier head provides a controllable load (e.g., an applied force) on the substrate to push it against the rotating polishing pad. A polishing liquid, such as slurry with abrasive particles, can also be disposed on the surface of the polishing pad during polishing.

A polishing pad generally includes a polishing surface that contacts the surface being polished during polishing. Previous CMP pad polishing surfaces may suffer from non-uniform polishing properties throughout their lifetime. For example, if the material removal rate decreases as the lifetime of the CMP pad increases, it may be difficult to reliably perform CMP processes. Changes in the properties of the polishing surface may result in CMP pads with variable and difficult-to-control polishing properties and corresponding variable and difficult-to-control CMP results, such as inconsistent material removal rates from a wafer being planarized/polished.

This disclosure recognizes that improved control of the properties of the microstructure of the polishing surface of a CMP pad can provide both more reliable and improved CMP performance. For example, this disclosure recognizes that a CMP pad with polymer particles embedded in the top polishing layer facilitates an improved conditionability of pad material and a more easily refreshed pad surface, because embedded particles become exposed as the polishing surface layer is gradually removed with extended use. This facilitates a more consistent surface texture and corresponding more consistent CMP performance over time. The embedded polymer particles also provide an increased polishing surface area through both protruding surface features resulting from polymer particles exposed at the CMP pad surface and pore-like surface features resulting from polymer particles that were removed from the CMP pad's surface (see FIGS. 2A and 2B and corresponding description below). This increased surface area and roughness improves CMP performance.

Chemical Mechanical Planarization System

FIG. 1 illustrates a system 100 for performing chemical mechanical planarization. System 100 includes a CMP pad 200 (also referred to as a "polishing pad," see also FIG. 2 and corresponding description below) which is placed on or attached to a platen 102. For example, an adhesive layer (not shown) may be used to attach the CMP pad 200 to the platen 102. The platen 102 can generally be rotated during chemical mechanical planarization. A wafer 104 (e.g., a silicon wafer with or without conductive, semi-conductive, and/or insulative layers, as described above) is attached to a head 106 of a rotatable chuck. The wafer 104 may be attached using vacuum and/or a reversible adhesive (e.g., an adhesive that holds the wafer 104 in place during chemical mechanical planarization but allows the wafer 104 to be removed from the head 106 after chemical mechanical planarization). As illustrated in FIG. 1, a pressure may be applied to the wafer 104 during chemical mechanical planarization (e.g., to facilitate contact between the surface of the wafer 104 and the CMP pad 200).

Figure 2A:
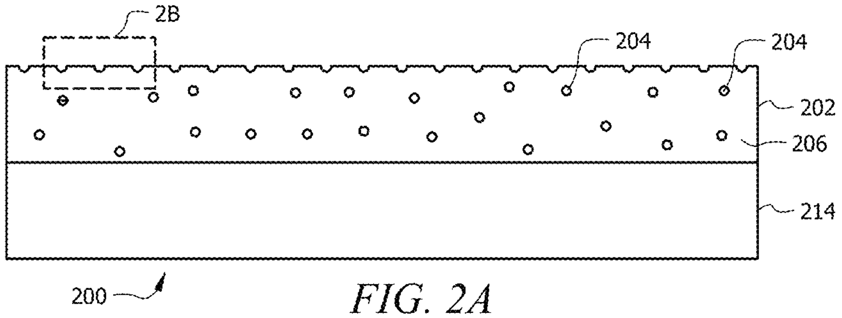
FIG. 2A is a diagram of an example CMP pad of this disclosure.
Figure 2B:
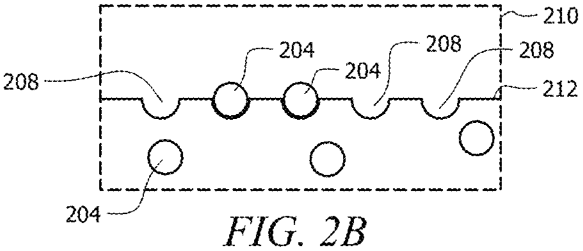
FIG. 2B is a diagram of an expanded view of the surface of the CMP pad of FIG. 2B.

An example CMP pad 200 is illustrated in FIGS. 2A and 2B and described in greater detail below. In brief, the CMP pad 200 generally has a circular or approximately cylindrical shape (i.e., with a top surface, a bottom surface, and a curved edge). The CMP pad 200 may comprise polyurethane, such as a flexible polyurethane or a rigid polyurethane. Examples of compositions and methods used to prepare example polishing pads 200 are described in greater detail below with respect to FIGS. 3 and 4. CMP pad 200 may have any appropriate thickness and any appropriate diameter (e.g., to be employed with a CMP system such as system 100). For instance, the thickness of a CMP pad 200 may be in a range from less than or about 0.5 millimeters (mm) to greater than 5 centimeters (cm). In some embodiments, the thickness of the CMP pad 200 may be in a range from 1 mm to 5 mm. Polishing pad diameter is generally selected to match or be just smaller than, the diameter of the platen 102 of the polishing system 100 used. The CMP pad 200 generally has a uniform or near-uniform thickness (e.g., a thickness that varies by no more than 50%, 25%, 20%, 10%, 5%, or less across the radial extent of the polishing pad).

A slurry 108 may be provided on the surface of the CMP pad 200 before and/or during chemical mechanical planarization. The slurry 108 may be any appropriate slurry for planarization of the wafer type and/or layer material to be planarized (e.g., to remove a silicon oxide layer from the surface of the wafer 104). The slurry 108 generally includes a fluid and particles that are abrasive and/or chemically reactive. Any appropriate slurry 108 may be used. For example, the slurry 108 may react with one or more materials being removed from a surface being planarized.

A conditioner 110 is a device which is configured to condition the surface of the CMP pad 200. The conditioner 110 generally includes a surface that contacts the top layer of the CMP pad 200 (e.g., the polishing portion or top pad 202 of FIGS. 2A and 2B, described below) and removes a portion of the top layer of the CMP pad 200 to improve its performance during chemical mechanical planarization. For example, the conditioner 110 may roughen the surface of the CMP pad 200. The new CMP pad 200 with polymer particles embedded in the top layer that is described in this disclosure may require less conditioning by the conditioner 110 than was required for previous CMP pads, because an appropriate surface texture is consistently maintained as the top layer is removed and embedded particles are exposed during CMP processes.

Example Polishing Pad

FIGS. 2A and 2B illustrate an example CMP pad 200 from a cross-sectional side view. The example CMP pad 200 includes a top pad 202 and subpad 214. The CMP pad 200 generally has a circular or approximately cylindrical shape. The thickness of the CMP pad 200 may be any appropriate value, such as in a range from about 1 mm to about 10 mm or more. The diameter of the CMP pad 200 may be any appropriate value, such as in a range from about 500 mm to about 800 mm or more. The CMP pad 200 generally has a uniform thickness. A uniform thickness is defined as a thickness that varies by no more than 50%, 25%, 20%, 10%, 5%, or less across the radial extent of the CMP pad 200. In other words, the thickness measured near the center of the CMP pad 200 is substantially the same as the thickness near the edge of the CMP pad 200.

The top pad 202 is the polishing portion of the CMP pad 200 and comes in contact with the surface being planarized/polished during CMP processes (e.g., the surface of the wafer 104 of FIG. 1, described above). As illustrated by the side-view depiction of FIG. 2A, the top pad 202 includes a polymeric body 206 in which a plurality of polymer particles 204 are embedded. The polymeric body 206 may be a polyurethane material, such as a thermoset polyurethane, or any other appropriate material. The polymer particles 204 may be any appropriate polymer. In some embodiments, the polymer particles 204 include poly (styrene-acrylonitrile) (SAN). The concentration of polymer particles 204 in the polymeric body 206 may be 0.5% to 40% by weight (for example, 1% to 30% by weight, 5% to 25% by weight). The polymer particles 206 may be approximately spherical in shape with a diameter in a range of 10 nanometers to about 50 micrometers (for example from 50 nanometers to 20 micrometers, 100 nanometers to 1000 nanometers).

As shown in the expanded view 210 of FIG. 2B near the surface 212 of the top pad 202, at least a portion of the polymer particles 204 is at least partially exposed at the surface 212 of the polymeric body 206. The surface 212 also includes a number of pores 208 at the surface of the polymeric body 206. The pores 208 may form when polymer particles 204 are removed from the surface 212 (e.g., during handling, planarization/polishing processes, and/or conditioning by the conditioner 110 of FIG. 1). The presence of the polymer particles 204 provides a number of technical benefits. For example, the roughness of the surface 212 may be increased by the presence of both the pores 208 and polymer particles 204 (see also FIGS. 7A and 7B and corresponding description below). Furthermore, during use of the CMP pad 200, the roughness of the surface 212 may be maintained at a relatively consistent value when material is removed from the top pad 202. For example, the roughness may be relatively constant as the material of the top pad 202 is removed because pores 208 and/or polymer particles 204 may be exposed that are at an increased depth from the surface 212 in the top pad 202. In some cases, the elasticity and/or other mechanical properties of the top pad 202 may be tuned via the presence of polymer particles 204 (see also FIGS. 5, 6A, and 7B and corresponding description below). For example, the concentration and/or size of the polymer particles 204 may be selected to obtain a desired elasticity, hardness, and the like for a given application (e.g., for the removal and/or planarization/polishing of a given material).

The material of the top pad 202 may be porous or non-porous. A top pad 202 may be prepared, for example, via forming a thermosetting polyurethane foam, via including a filler material in the polyurethane composition (e.g., a porogen filler 310, as described with respect to FIG. 3 below), or via including hollow microspheres (e.g., polymeric microsphere fillers 310, as described with respect to FIG. 3 below) in the polyurethane composition. Porous embodiments of the top pad 202 may have substantially any suitable porosity, for example, ranging from about 5 to about 60 volume percent (e.g., from about 10 to about 50 volume percent, from about 15 to about 50 volume percent, or from about 20 to about 40 volume percent). Non-porous embodiments of the top pad 202 generally have a porosity of less than about 5 volume percent.

In some cases, the surface 212 of the top pad 202 may include grooves or any other appropriate structure or pattern for facilitating CMP process. For instance, grooves may facilitate the transport of etched material and/or any other products of the CMP process away from the surface 212 of the top pad 202 and the wafer 104 being planarized. The top pad 202 may have any appropriate thickness. For example, the thickness of the top pad 202 may be in a range from about 0.2 mm to about 5 mm.

The subpad 214 may provide a relatively compressible support for the top pad 202. The subpad 214 may be a polyurethane material, such as a thermoset polyurethane. The subpad 214 may have any appropriate thickness. For example, the thickness of the subpad 204 may be in a range from about 0.2 mm to about 5 mm.

The top pad 202 and the subpad 214 may be held together with or without an adhesive to form the CMP pad 200. For example, in cases where an adhesive is used, the top pad 202 may be secured to the subpad 214 by a thin adhesive layer (e.g., a layer of pressure-sensitive adhesive, such as tape, glue, etc.). Other adhesives may also or alternatively be used as appropriate. For example, the adhesive may be a hot-melt adhesive, or the top pad 202 and subpad 214 may be connected by laminating a thin layer of a thermoplastic material between the top pad 202 and subpad 214. A platen adhesive may be used to secure the CMP pad 200 to the platen 102 illustrated in FIG. 1 in order to perform CMP.

In some embodiments, the CMP pad 200 may include more or fewer layers. For instance, in some embodiments, a CMP pad 200 does not include the subpad 214. In other embodiments, the CMP pads 200 may include additional layers not shown in FIG. 2.

Composition for Preparing Textured CMP Pad Surface

Figure 3:
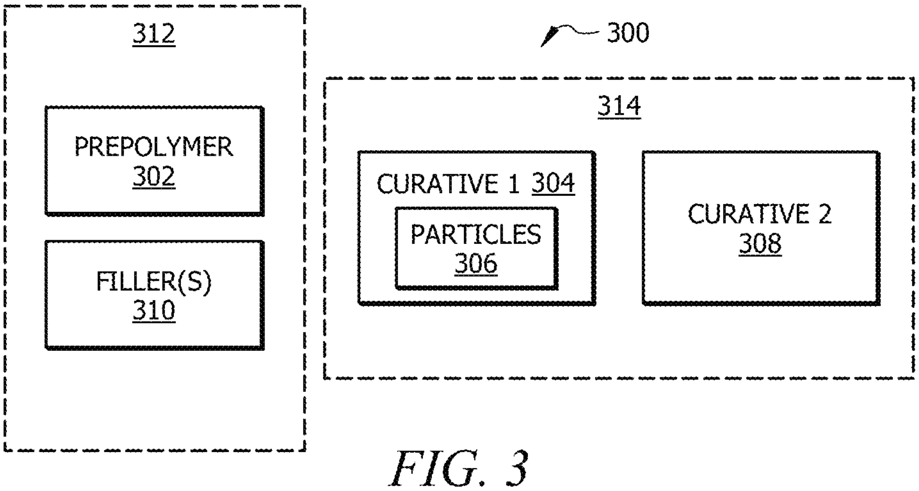
FIG. 3 is block diagram illustrating an example mixture for preparing the example CMP pad of FIG. 2.

FIG. 3 illustrates an example mixture 300 used for preparing the top pad 202 and CMP pad 200 of FIG. 2. The mixture 300 includes a prepolymer 302, a first curative 304 that may be mixed with polymer particles 306, a second curative 308, and any optional fillers 310.

The prepolymer 302 may be an isocyanate-terminated urethane prepolymer. The prepolymer 302 may be prepared by reacting a polyfunctional aromatic isocyanate and a prepolymer polyol. Example polyfunctional aromatic isocyanates may include a toluene diisocyante (TDI) compound such as 2,4-TDI, 2,6-TDI, and mixtures thereof a methylenediphenyl diisocyanate (MDI) compound such as 2,2'-MDI, 2,4'-MDI, and 4,4'-MDI (which is also referred to in the art as 4,4'-diphenylmethane diisocyanate), and mixtures thereof a naphthalene-1,5-diisocyanate; a tolidine diisocyanate; a para-phenylene diisocyanate; a xylylene diisocyanate; and mixtures thereof. The polyol prepolymer 302 may include substantially any suitable diol, polyol, polyol-diol, as well as copolymers and mixtures thereof. For example, the polyol prepolymer 302 may include polytetramethylene ether glycol (PTMEG), polypropylene ether glycol (PPG), ethylene oxide capped PTMEG or PPG, polycaprolactone, ester-based polyols, such as ethylene or butylene adipates, copolymers thereof and mixtures thereof. It will be understood that suitable polyols such as PTMEG and PPG may be mixed with low molecular weight polyols, including ethylene glycol, 1,2-propylene glycol, 1,3-propylene glycol, 1,2-butanediol, 1,3-butanediol, 2-methyl-1, 3-propanediol, 1,4-butanediol, neopentyl glycol, 1,5-pentanediol, 3-methyl-1, 5-pentanediol, 1,6-hexanediol, diethylene glycol, dipropylene glycol, tripropylene glycol and mixtures thereof.

The first curative 304 may be a copolymer polyol (CPP) curative. CPPs are produced by polymerizing one or more unsaturated monomers in a polyol through free radical polymerization. The first curative 304 may be a fluid that is mixed with the polymer particles 306. The polymer particles 306 may be the same as the polymer particles 204 of FIG. 2. For example, the polymer particles 306 may be polystyrene, copolymerized styrene and acrylonitrile, polyurethane or polyurea particles, and the like. The polymer particles 306 are generally retained in the top pad 202 of the CMP pad 200 (e.g., in their original form or as modified during formation of the CMP pad 200 through exposure to other components 302, 308, 310 of the mixture 300, exposure to heat, exposure to mechanical forces during mixing, etc.). The addition of SAN polymer particles 306 to mixture 300 may result in harder and more resilient CMP pads 200 than would be achieved using the first curative 304 alone.

The limited solubility of the polymer particles 306 (e.g., of SAN polymers) in the first curative 304 results in phase separation, such that the polymer particles 306 are evenly distributed within the first curative 304. During polymerization (see FIG. 4), free-radical initiators may abstract hydrogen from the polyol curative 304 and provide free-radical sites on the polyol chain. This stabilizes the polymer particles 306 in the first curative 304. The first curative 304 may include so-called "macromers" which are typically A-B functional monomers with vinyl and hydroxyl functionalities. These macromers may improve stability of the polymer particles 306 in the first curative 304 and prevent agglomeration of the polymer particles 306. The concentration of the polymer particles 306 in the first curative 304 (in percent solids) may be up to 50 wt % or more.

The second curative 308 may be a polyamine curative. The second curative 308 may include substantially any suitable polyamine, for example including diamines and other multifunctional amines. The second curative 308 may be a low molecular weight polyamine curative. Example diamines may include aniline diamine compounds, toluene diamine compounds, aminobenzoate compounds, and mixtures thereof. Example aniline diamine compounds include 4,4-methylenebis(2-chloroaniline) (MBCA or MOCA); 4,4'-methylene-bis-o-chloroaniline (MbOCA); 4,4'-methylene-bis-(3-chloro-2,6-diethylaniline) (MCDEA); 4,4'-methylene-bis-aniline; and 1,2-bis(2-aminophenylthio)ethane. Example toluene diamine compounds include dimethylthiotoluenediamine; diethyltoluenediamine; 5-tert-butyl-2,4- and 3-tert-butyl-2,6-toluenediamine; 5-tert-amyl-2,4- and 3-tert-amyl-2,6-toluenediamine; and chlorotoluenediamine. Example aminobenzoate compounds include trimethyleneglycol di-p-aminobenzoate; polytetramethyleneoxide di-p-aminobenzoate; polytetramethyleneoxide mono-p-aminobenzoate; polypropyleneoxide di-p-aminobenzoate; and polypropyleneoxide mono-p-aminobenzoate. Aniline diamine compounds, such as 4,4-methylenebis(2chloroaniline), and toluene diamine compounds, such as dimethylthiotoluenediamine, may be preferred in some cases (although the disclosed embodiments are not limited in this regard).

The optional fillers 310 generally include any additional components of the mixture 300. The fillers 310 may provide different physical, mechanical, and/or chemical properties to the top pad 202. Filler(s) 310 may include lubricants and/or porosity forming agents, such as microspheres or gas. For example, filler(s) 310, may include porogens which form pores in the top pad 202. Filler(s) 310 may include species that react with the surface being polished/planarized and/or a slurry applied to the surface being polished/planarized.

Figure 4:
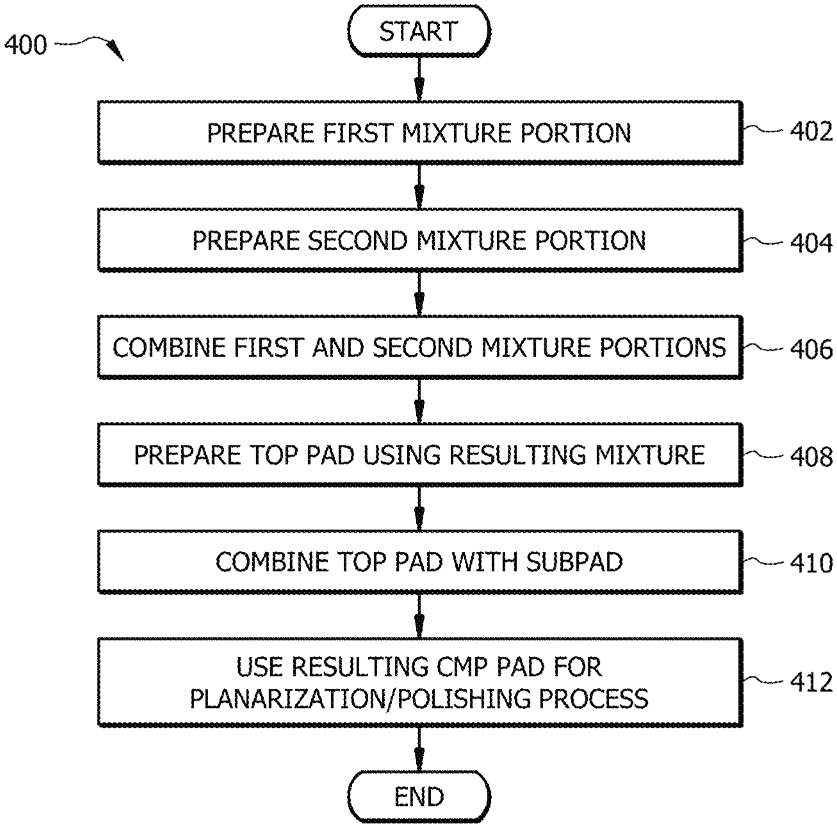
FIG. 4 is a flowchart illustrating an example method for preparing a polishing portion of a CMP pad, preparing a CMP pad with the polishing portion, and using the CMP pad.

The top pad 202 illustrated in FIGS. 2A and 2B may be fabricated from mixture 300 using substantially any suitable pad manufacturing techniques (e.g., as illustrated in FIG. 4, described below), such as casting, molding, coating, extruding, printing, sintering, spraying, and the like. The disclosed pad embodiments are not limited in regard to any particular manufacturing technique. For example, the top pad 202 may be fabricated using any of a variety of molding and casting techniques. As a non-limiting example, a first portion 312 of the mixture 300 may be prepared that includes the prepolymer 302 and any optional filler(s) 310, and a second portion 314 of the mixture 300 may be prepared by combining the first curative 304 with polymer particles 306 and the second curative 308. The two portions 312, 314 may be individually prepared and then blended together at a predetermined blend ratio and/or temperature. The resulting mixture 300 may then be poured into a mold where it is maintained at an elevated temperature, for example, between about 60° C. and about 160° C. The mold may optionally be deployed in a closed chamber and exposed to vacuum or pressure to expel air trapped in the poured blend. After a predetermined time (e.g., about 10 to about 30 minutes), the top pad 202 may be removed from the mold and then cured (e.g., for approximately 6 to 12 hours at a temperature in a range from about 30° C. to about 100° C.).

If the CMP pad 200 includes a subpad 214, the appropriate subpad 214 may be prepared either simultaneously or separately using a similar molding process or any other appropriate process. The top pad 202 may be attached to the subpad 214 using any appropriate mechanism, such as an adhesive and/or application of heat, to prepare the CMP pad 200.

Method of Preparing Textured CMP Pad Surface

FIG. 4 illustrates an example process 400 for preparing a top pad 202 with embedded polymer particles 204 and a CMP pad 200 that includes this top pad 202 and using the resulting CMP pad 200. The process 400 may begin at step 402 where the first mixture portion 312 of FIG. 3 is prepared. For example, the first mixture portion 312 may be prepared by combining the prepolymer 302 and any optional filler(s) 310. At step 404, the second mixture portion 314 is prepared. For example, the second mixture portion 314 may be prepared by combining the first curative 304 with polymer particles 306 and the second curative 308. At step 406, the first mixture portion 312 and second mixture portion 314 are combined to prepare mixture 300. In some embodiments, steps 402, 404, and 406 may be performed in different orders and/or combinations to prepare mixture 300.

At step 408, the top pad 202 is prepared using the mixture 300 from step 406. For example, the top pad 202 may be prepared using casting, molding, coating, extruding, printing, sintering, spraying, or the like. For instance, the mixture 300 may be poured into a mold and a polymerization reaction may be initiated in the mold to form the polymeric body 206 of the top pad 202. For example, the mixture 300 may be maintained at an elevated temperature, for example, between about 60° C. and about 160° C. The mold may optionally be deployed in a closed chamber and exposed to vacuum or pressure to expel air trapped in the poured mixture 300. After a predetermined time (e.g., about 10 to about 30 minutes), the top pad 202 may be removed from the mold and then cured (e.g., for approximately 6 to 12 hours at a temperature in a range from about 30° C. to about 100° C.).

At step 410, the top pad 202 from step 408 may be combined with a subpad 214. The subpad 214 may be prepared using a similar or different process than that used to prepare the top pad 202. In general, the subpad 214 may be prepared using casting, molding, coating, extruding, printing, sintering, spraying, or the like. The top pad 202 may be attached to the subpad 214 using any appropriate mechanism, such as an adhesive and/or application of heat, to prepare the CMP pad 200.

At step 412, the resulting CMP pad 200 from step 410 may be used for a planarization/polishing process, for example, as described with respect to FIG. 1 above. Referring to FIG. 2, as polishing/planarization processes are performed a relatively constant surface roughness is maintained as embedded polymer particles 204 are exposed at the surface 212 to form exposed polymer particles 204 and/or pores 208, resulting in improved and more consistent CMP results.

EMBODIMENTS (1) In embodiment (1) is presented a chemical mechanical polishing pad comprising a polishing portion, the polishing portion comprising:

a polymeric body;

a plurality of polymer particles embedded within the body of the polymeric body, wherein at least a portion of the plurality of polymer particles is at least partially exposed at a surface of the polymeric body; and a plurality of pores at the surface of the polymeric body.

(2) In embodiment (2) is presented the chemical mechanical polishing pad of embodiment (1), wherein a concentration of the plurality of polymer particles embedded within the polymeric body is in a range of 0.5% to 40% by weight.

(3) In embodiment (3) is presented the chemical mechanical polishing pad of embodiments (1) or (2), wherein the polymer particles have an average size of about 10 nanometers to about 50 micrometers.

(4) In embodiment (4) is presented the chemical mechanical polishing pad of any one of embodiments (1) to (3), wherein the polymeric body comprises polyurethane.

(5) In embodiment (5) is presented the chemical mechanical polishing pad of any one of embodiments (1) to (4), wherein the polymer particles comprise styrene acrylonitrile.

(6) In embodiment (6) is presented the chemical mechanical polishing pad of any one of embodiments (1) to (5), wherein the porosity of the polishing portion is in a range from about 10% to 80%.

(7) In embodiment (7) is presented the chemical mechanical polishing pad of any one of embodiments (1) to (6), wherein the elastic storage modulus of polishing portion is in a range from about 50 MPa to about 1000 MPa measured at 25° C.

(8) In embodiment (8) is presented the chemical mechanical polishing pad any one of embodiments (1) to (7), wherein a hardness of the polishing portion is in a range from about 50 to 80 on the Shore D scale.

(9) In embodiment (9) is presented the chemical mechanical polishing pad any one of embodiments (1) to (8), further comprising a subpad portion attached to the polishing portion.

(10) In embodiment (10) is presented a method of producing a polishing portion of a chemical mechanical polishing pad of any one of embodiments (1) to (9).

(11) In embodiment (11) is presented the method of embodiment (10), further comprising:

preparing a first mixture comprising a prepolymer;

preparing or obtaining a first curative comprising polymer particles;

preparing a second mixture by combining the first curative comprising the polymer particles with a second curative;

combining the first mixture and the second mixture;

transferring the combined first and second mixtures into a mold; and initiating a polymerization reaction in the mold to form a polymeric body of a polishing portion of the chemical mechanical polishing pad.

(12) In embodiment (12) is presented a composition for preparing the chemical mechanical polishing pad of any one of embodiments (1) to (9),

(13) In embodiment (13) is presented the composition of embodiment (12), the composition comprising:

a prepolymer;

a first curative; and polymer particles.

(14) In embodiment (14) is presented the composition of embodiment (13), the composition further comprising a second curative and/or optionally one or more fillers.

Example Experimental Examples

Preparation of Samples for Mechanical Property Tests

An example procedure for preparing an example testing sample (e.g., CMP pad 200, described above) of this disclosure is described in the following. A first set of solid or porous samples was prepared by compression molding with a 9-inch square mold of 80 mil thickness. A mixture of prepolymer without fillers, a first CPP curative, and a second curative (dimethylthiotoluenediamine, in this example) was poured in a pre-heated mold and compression molded at 260° F. for 10 min. The pre-cured samples were then released from the mold and cured in a vented oven for 12 hours at a temperature of 200° F. The samples were then cut into pieces to perform various mechanical property tests without further surface treatment.

Preparation of CMP Pads for Planarization Testing

Another example procedure for preparing an example CMP pad (e.g., CMP pad 200, described above) of this disclosure is described in the following. The CMP pads used for planarization testing were prepared in a batch manner using a molding system. The prepolymer was first mixed with fillers and then mixed with the second curative and CPP curative with polymer particles (or without for controls). The mixture was then transferred to separate tanks of the molding system and pre-heated. The final mixture was dispensed onto the base of a 30 inch diameter mold. The CMP pad was then left in the mold under vacuum for 10 min at 260° F. The number of components dispensed, molding time, pressure, mold design, and/or base temperature was varied between certain tested compositions.

The resulting CMP pads were then released from the mold and cured in a vented oven for 16 hours at 230° F. The cured pads were than used for testing. For mechanical testing, the grooves were removed by CNC milling. For planarization polishing tests, the pads were thinned down to 65 mil from the backside with slight fine surfacing on the grooved side. The surfaced top pads were laminated with subpad and platen adhesive, and windows were installed to observe certain polishing processes when necessary. All CMP pads in the examples used the same top pad thickness, subpad, and platen adhesive.

Mechanical Testing

Hardness: The hardness of various test samples (Shore D hardness) was measured at 25° C. using a standard durometer hardness test according to the procedure set forth in ASTM 2240 and ISO 868.

Density: The densities of various prepared samples were measured using a pycnometer. Samples were cut into 1-inch diameter circles for testing. During testing, samples displaced isopropyl alcohol in a wet pycnometer, and the apparent density was determined by the gravimetric method.

Modulus: The elastic storage modulus (F) of various samples was measured as a function of temperature using dynamic mechanical analysis (DMA). Cured samples were cut into 6 mm by 30 mm rectangular sections and mounted in a tensile clamp. The physical dimensions of each sample were measured using a micrometer prior to DMA. The DMA tests were conducted in the standard multi-frequency controlled strain tensile mode with a frequency of 1 Hz, an amplitude of 30 microns, and a temperature ramp rate of 5° C. per minute from −50 to 180° C. under dry conditions with air flowing. DMA measurements were made in accordance with ASTM D4065.

Surface roughness: Post polishing pad surface roughness was obtained using a digital light microscope configured for three-dimensional (3D) measurements (IF (InfiniteFocus)-Measure from Alicona). The surface roughness data presented in TABLE 1 below) are an average from nine measurements at different locations near the center, middle, and edge of CMP pad samples. Sa is the average surface roughness of the measured area; Spk is the mean height of the peaks above the core material; and Svk is the mean depth of valleys below the core material.

The embedded polymer particles in Sample Pad 1 had an increased surface roughness over that of the control pad via both protruding surface features resulting from polymer particles exposed at the CMP pad's surface and the pore-like surface features resulting from polymer particles removed from the CMP pad's surface. An increase surface roughness (Sa) with higher asperity height (Spk) and deeper valley height (Svk) were observed for Sample Pad 1 compared to the control pad. The increased surface roughness of Sample Pad 1 may provide an improved removal rate (as demonstrated below) without requiring the pad to be prepared using a harder material.

TABLE 1 surface roughness values for a control CMP pad and Sample Pad 1

| | Control 1 | Sample Pad 1 |
|---|---|---|
| Sa (μm) | 4.54 | 5.32 |
| Spk (μm) | 6.40 | 7.40 |
| Svk (μm) | 6.60 | 8.02 |

Mechanical Properties of Example CMP Pads Prepared from Different Mixture Compositions TABLE 2 shows a list of various samples prepared for mechanical testing, as described with respect to FIGS. 5, 6A, and 6B below. TABLE 2 shows properties of the curative 304 and polymer particles 306 used to prepare the mixture 300 used to prepare the samples of the CMP pad 200 are shown. In TABLE 2, OH #refers to the density of hydroxyl groups per mass of material (e.g., in component 304 of FIG. 3), particle content refers to the mass percentage of SAN polymer particles (e.g., component 306 of FIG. 3) in the CPP curative (e.g., component 304 of FIG. 3), nominal functionality refers to the number of functional groups on each molecule of the CPP curative, and the viscosity 25 C/40 C refers to the viscosity of the mixture of the CPP curative and the SAN particles (if measured) at 25° C. and 40° C. SAMPLE 1 is a polyether polyol with 10% SAN particles dispersed in a high molecular weight reactive polyol that has a hydroxyl number 30.0±2.0 mg KOH/g. SAMPLE 2 is a polyurea-filled polyether polyol. SAMPLES 3, 4, and 5 are different formulations of graft polyether polyols that contain dispersed SAN particles of co-polymerized styrene and acrylonitrile.

TABLE 2

Properties of CPP curative and SAN particles in different tested samples

| Name | OH# | Particle Content | Nominal Functionality |
|---|---|---|---|
| SAMPLE 1 | 30 | SAN 10% | 3 |
| SAMPLE 2 | 28 | none | 3 |
| SAMPLE 3 | 71 | SAN 50% | 2 |
| SAMPLE 4 | 31 | SAN 45% | 3 |
| SAMPLE 5 | 24 | SAN 32% | 3 |

Figure 5:
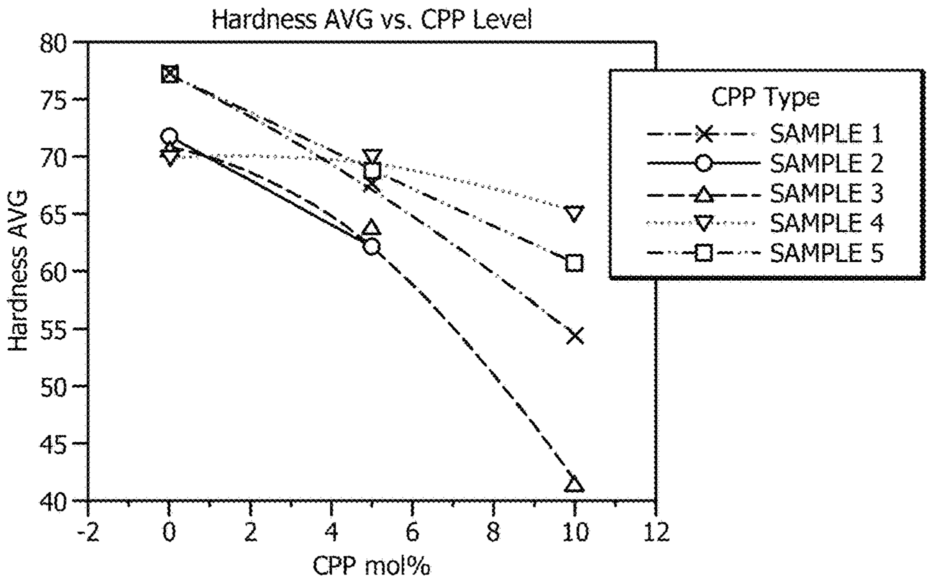
FIG. 5 is a plot of average hardness as a function of the amount of copolymer polyol (CPP) curative added to the mixture used to prepare a CMP pad samples.

The average hardness of the samples from TABLE 2 prepared with different concentrations of the CPP curative (e.g., component 304 of FIG. 3) and SAN particles (e.g., component 306 of FIG. 3) are shown in FIG. 5. As the amount of the CPP curative increases, the hardness decreases. The elastic storage modulus (F) of samples from TABLE 2 prepared with different concentrations of the CPP curative (e.g., the first curative 304 of FIG. 3) are shown in FIGS. 6A and 6B. FIG. 6A shows values of the elastic storage modulus at 25° C., while FIG. 6B shows values of the elastic storage modulus at 50° C. Similarly to hardness, as the amount of the CPP curative increases, the elastic storage modulus decreases. The effect of hardness or modulus change needs to be recognized in determining the range of particle (e.g., component 306 of FIG. 3) content described herein.

Figure 6A:
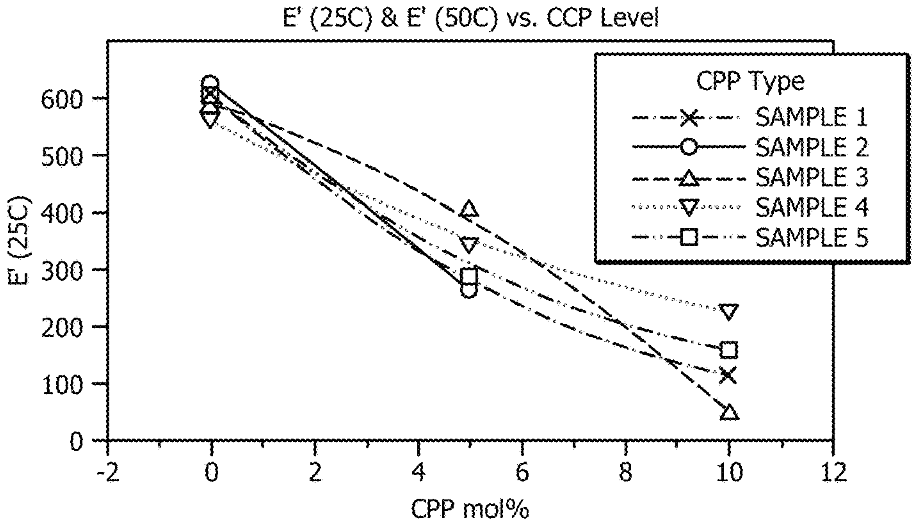
FIGS. 6A and 6B are plots of the elastic modulus of samples prepared using different amounts of CPP curative included in the mixture used to prepare the samples at different temperatures.
Figure 6B:
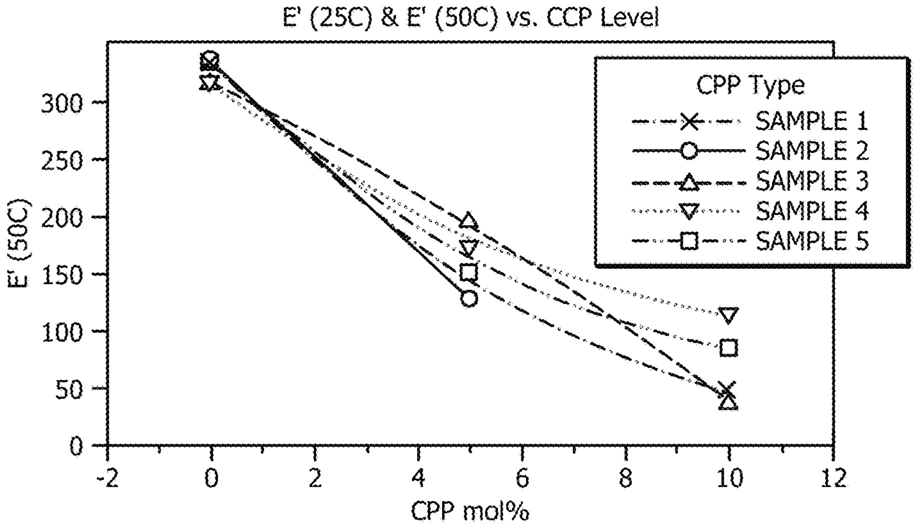

As shown in FIGS. 5, 6A, and 6B, when the amount of SAN particles (e.g., of component 306 of the mixture 300) increases, as is the case for SAMPLE 3 and SAMPLE 4, a smaller change in both hardness and elastic storage modulus is observed with increasing CPP curative concentration. This may be beneficial in cases where a higher hardness and elastic storage modulus may be preferred. In some cases, it may be possible and/or advantageous to tune the elastic storage modulus and/or hardness (e.g., to obtain properties desirable for a given polishing/planarization application) by adjusting the concentration of the CPP curative (e.g., component 304 of FIG. 3) and/or the concentration of the SAN particles (e.g., component 306 of FIG. 3). In some cases, the elastic storage modulus of polishing portion is in a range from about 20 MPa to about 1500 MPa measured at 25° C., for example 50 MPa to about 1000 MPa measured at 25° C. Additionally, in some cases, the elastic storage modulus is in a range of about 20 MPa to about 400 MPa measured at 50° C., for example 25 MPa to about 35 MPa at 50° C.

Effect of SAN Particles on Surface Texture

Figure 7A:
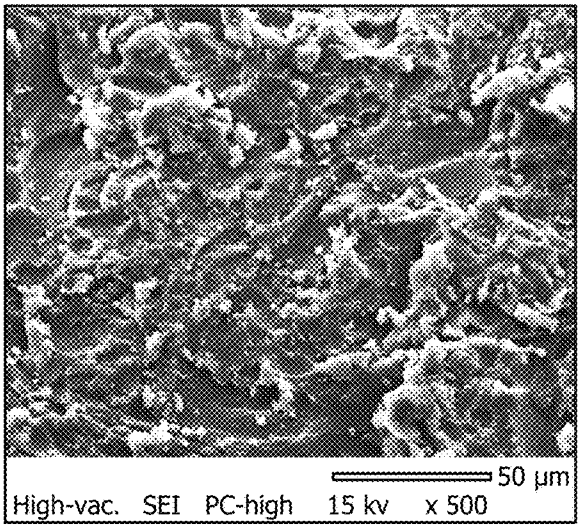
FIG. 7A is an SEM image of the surface of a conventional CMP pad.
Figure 7B:
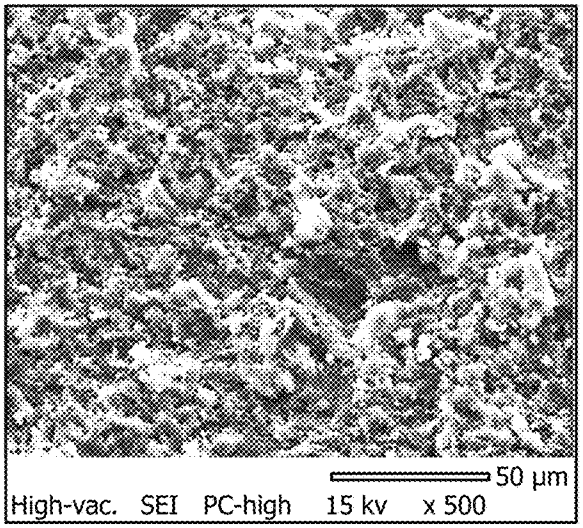
FIG. 7B is an SEM image of the surface of an example of the CMP pad described in this disclosure.

In order to observe the effect of the use of the CPP curative (e.g., component 304 of FIG. 3) and SAN particles (e.g., component 306 of FIG. 3) on the surface texture of CMP pads, a series of samples were conditioned and imaged using scanning electron microscopy (SEM), as shown in FIGS. 7A and 7B. The SEM image of FIG. 7A shows a conventional CMP pad that lacks pores after conditioning and has a limited surface texture. In comparison, when the CPP curative with SAN particles (5 mol % of CPP from SAMPLE 4, 6.2 wt. % SAN particles) is used, as shown in FIG. 7B, the surface has a visibly increased roughness with sub-micron to micron-sized pores. The SEM image in FIG. 7B corresponds to the surface 212 depicted in FIG. 2 with increased roughness provided by both particles 204 at the surface 212 and pores 208 resulting from removed particles 204. Further testing also confirmed that the increased surface roughness and porosity achieved using the CPP curative and SAN particles was the result of the combination of both the CPP and the SAN particles and was not achieved through the addition of the CPP curative alone.

Chemical Mechanical Planarization Performance

The performance of an example CMP pad was evaluated using a tungsten slurry (W8900 from CMC Materials). The example CMP pads were evaluated using a Reflexion LK CMP polisher (available from Applied Materials) and Silyb Tungsten wafers that included: (1) a "6 k blanket wafer" with 6000 angstroms (Å) of flat Tungsten film deposited using chemical vapor deposition; (2) a "2 k 854 pattern wafer" sample, with 2000 Å Tungsten film of 2000 Å deposited onto a special patterned surface; and (3) a "5 k 854 pattern" sample, with 5000 Å Tungsten film of 2000 Å deposited onto a special patterned surface. Another example for evaluating CMP performance used a dielectric slurry (D9228 from CMC Materials) for CMP of an oxide surface. The tested oxide surfaces were a blanket oxide wafer with 20000 Å of silica oxide deposited from tetraethyl orthosilicate (TEOS) using chemical vapor deposition.

CMP pads, referred to as Sample Pad 1, were prepared using a polyurethane prepolymer based on toluene diisocyanate (TDI) and polytetramethylene ether glycol (PTMEG) with an NCO number of 10.18, CPP curative containing SAN particles, a second curative of dimethylthiotoluenediamine, and fillers (SAMPLE 4). The formulation contained 66 parts of prepolymer, 14.5 parts of CPP curative, 16.5 parts of the second curative, and 3 parts of the pore fillers. Pad Sample 1 had a similar hardness and density to a CMP pad without embedded polymer particles, which was used as a control in removal rate studies. TABLE 3 shows the performance of the Sample Pad 1 for tungsten removal compared to the performance of the control CMP pad. Sample Pad 1 displayed an improved tungsten removal rate (RR) on blanket tungsten wafer and two different thicknesses of patterned wafers without sacrificing performance in terms of dishing and erosion.

TABLE 3

Example tungsten removal rate (RR) results using the inventive CMP pad (Pad Sample 1) and the control CMP pad.

| | CONTROL | Pad Sample 1 |
|---|---|---|
| CPP | None | SAMPLE 4 - 5 mol % |
| Hardness Shore D | 62D | 61D |
| Density (g/mL) | 0.80 | 0.80 |
| Blanket RR (Å/min) | 4338 | 5796 |
| 2k Pattern removal rate (RR) (Å/min) | 4589 | 5954 |
| 5k Pattern RR (Å/min) | 5243 | 6319 |
| Dishing (Å, 1 um × 1 um) | 48 | 55 |
| Erosion(Å, 1 um × 1 um) | 88 | 57 |

Similar improvements to performance were observed for the removal of an oxide layer, as shown in the examples of TABLE 4 below, which shows oxide removal rates of Pad Sample 1 compared to a control and other samples without the CPP curative ($CONTROL_2$ and $CONTROL_3$). Pad Sample 1 has a higher oxide removal rate (RR) than any of the other samples tested, even with lower hardness and porosity (higher density) than $CONTROL_2$ and $CONTROL_3$ which are usually seen as being driving factors for higher oxide removal rate.

TABLE 4

Example oxide removal rate results using the inventive CMP pad (Pad Sample 1 and different control CMP pads.

| | CONTROL | Pad Sample 1 | $CONTROL_2$ | $CONTROL_3$ |
|---|---|---|---|---|
| Prepolymer | PET75D | PET75D/80DPLF (50/50) | | |
| Pore Filler | 3% | 3% | 3% | 4% |
| CPP | none | 5 mol % | none | none |
| Hardness (Shore D) | 62 | 61 | 66 | 64 |
| Density (g/mL) | 0.80 | 0.80 | 0.77 | 0.72 |
| Blanket Oxide RR (Å/min) | 2821 | 3294 | 2993 | 3120 |

Modifications, additions, or omissions may be made to the systems, apparatuses, and methods described herein. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better explain the disclosure and does not pose a limitation on the scope of claims.

The invention claimed is:

1. A chemical mechanical polishing pad comprising a polishing portion, the polishing portion comprising:

a polymeric body having a polishing surface;

a plurality of solid, rigid polymer particles embedded within the body of the polymeric body, wherein at least a portion of the plurality of polymer particles is at least partially exposed at the polishing surface of the polymeric body, the exposed portion of the polymer particles protruding from the polishing surface of the polymeric body; and a plurality of pores at the polishing surface of the polymeric body, wherein an average surface roughness (Sa) of the polishing surface of the ranges from 5.32 μm to 8.02 μm.

2. The chemical mechanical polishing pad of claim 1, wherein a concentration of the plurality of polymer particles embedded within the polymeric body is in a range of 0.5% to 40% by weight.

3. The chemical mechanical polishing pad of claim 1, wherein the polymer particles have an average size of about 10 nanometers to about 50 micrometers.

4. The chemical mechanical polishing pad of claim 1, wherein the polymeric body comprises polyurethane.

5. The chemical mechanical polishing pad of claim 1, wherein the polymer particles comprise styrene acrylonitrile.

6. The chemical mechanical polishing pad of claim 1, wherein the porosity of the polishing portion is in a range from about 10% to 80%.

7. The chemical mechanical polishing pad of claim 1, wherein the elastic storage modulus of polishing portion is in a range from about 50 MPa to about 1000 MPa measured at 25° C.

8. The chemical mechanical polishing pad of claim 1, wherein a hardness of the polishing portion is in a range from about 50 to 80 on the Shore D scale.

9. The chemical mechanical polishing pad of claim 1, further comprising a subpad portion attached to the polishing portion.

10. A method of producing a polishing pad comprising:

preparing a first mixture comprising a prepolymer;

preparing or obtaining a first curative comprising polymer particles; preparing a second mixture by combining the first curative comprising the polymer particles with a second curative;

combining the first mixture and the second mixture;

transferring the combined first and second mixtures into a mold; and initiating a polymerization reaction in the mold to form a polymeric body of a polishing portion of the chemical mechanical polishing pad, the polymeric body comprising a plurality of solid, rigid polymer particles embedded within the body of the polymeric body, wherein at least a portion of the plurality of polymer particles is at least partially exposed at a polishing surface of the polymeric body together with a plurality of pores at the polishing surface of the polymeric body, the exposed portions of the polymer particles protruding from the polishing surface of the polymeric body and wherein an average surface roughness (Sa) of the polishing surface of the ranges from 5.32 μm to 8.02 μm.

11. The method of claim 10, wherein the polymer particles have an average size of about 10 nanometers to about 50 micrometers.

12. The method of claim 10, wherein the polymer particles comprise styrene acrylonitrile.

13. The method claim 10, wherein the polymeric body comprises polyurethane.

* * * * *